United States Patent [19]

Kusakabe et al.

[11] Patent Number: 5,074,949
[45] Date of Patent: Dec. 24, 1991

[54] TIRE SIDE MEMBER RAISING AND PRESSURE-JOINING APPARATUS

[75] Inventors: Michio Kusakabe; Hiroki Hayashi, both of Kurume, Japan

[73] Assignee: Bridgestone Corporation, Tokyo, Japan

[21] Appl. No.: 570,658

[22] Filed: Aug. 21, 1990

[30] Foreign Application Priority Data

Aug. 31, 1989 [JP] Japan .............................. 1-102380[U]

[51] Int. Cl.$^5$ .............................................. B29D 30/18
[52] U.S. Cl. .................................... 156/402; 156/410; 156/413; 156/421
[58] Field of Search ................ 156/400, 402, 408–410, 156/412, 413, 421

[56] References Cited

U.S. PATENT DOCUMENTS

| | | | |
|---|---|---|---|
| 1,536,377 | 5/1925 | Convery | 156/403 X |
| 1,657,846 | 1/1928 | Stevens | 156/403 X |
| 3,031,353 | 4/1962 | Mallory | 156/402 |
| 3,616,060 | 10/1971 | Askam et al. | 156/402 |
| 4,145,238 | 3/1979 | Bottasso et al. | 156/402 |

*Primary Examiner*—Michael W. Ball
*Assistant Examiner*—Francis J. Lorin
*Attorney, Agent, or Firm*—Sughrue, Mion, Zinn, Macpeak & Seas

[57] ABSTRACT

A tire side member raising and pressure-joining apparatus includes two support shafts movable toward and away from each other and toward and away from a semi-produced tire, two raising rollers tapered toward their free ends and support by forward ends of the support shafts rotatably about center axes of the support shafts, respectively, and two pressure-joining rollers supported at distal ends of the forward ends of the support shafts rotatably about rotating axes perpendicular to the center axes of the support shafts, respectively. Parts of the pressure-joining rollers extend from free ends of the raising rollers. While the semi-produced tire is being rotated, side members are raised by the raising rollers and the raised side members are pressure-joined to sidewall portions of the semi-produced tire by the pressure-joining rollers.

8 Claims, 3 Drawing Sheets

TIRE SIDE MEMBER RAISING AND PRESSURE-JOINING APPARATUS

BACKGROUND OF THE INVENTION

This invention relates to a tire side member raising and pressure-joining apparatus for raising side members and pressure-joining the raised side members to side wall portions while a toroid-shaped semi-produced tire is being rotated.

Tire side member raising and pressure-bonding apparatus have been known, for example, as disclosed in Japanese Patent Application Laid-open No. 52-108,469. As shown in FIG. 1, such a apparatus includes a disc-shaped pressing roller 2 rotatable about its axis A perpendicular to a rotating axis of a semi-produced tire 1, a column-shaped raising roller 3 rotatable about its axis B perpendicular to the rotating axis A of the roller 2 and a non-rotatable shield 4 arranged between the rollers 2 and 3. With this apparatus, while the toroid-shaped semi-produced tire is being rotated, a side member 5 is raised by means of the raising roller 3 and the raised side member 5 is then pressure-joined to a side wall portion 6 of the tire by means of the pressing roller 2.

However, since roller 3 is rotated about the rotating axis B in parallel with the axis of the semi-produced tire 1 and is also column-shaped, it is very difficult, if not impossible, for the roller 3 to cause a force for raising the side member 5 in an oblique outward direction as shown by an arrow in FIG. 1. Therefore, it takes considerable time to raise the side member 5 by the roller 3, with resulting low production efficiency. What is worse still, the side member 5 is unduly subjected to a force by the roller 3 to cause wrinkles or scratches or flaws in the side member 5. Such wrinkles are also caused by the non-rotatable shield 4 contacting the side member 5.

SUMMARY OF THE INVENTION

It is a object of the invention to provide a tire side member raising and pressure-joining apparatus which can raise side members and pressure-join the raised side members to a semi-produced tire with high efficiency without causing any wrinkles and scratches or flaws in the side members.

In order to accomplish the object, a tire side member raising and pressure-joining apparatus according to the invention comprises support shafts, raising rollers each supported by a forward end of each of the support shafts rotatably about a center axis of the relevant support shaft as a rotating axis and being frustoconical tapered toward its free end, and pressure joining rollers each supported at a distal end of the forward end of each of the support shafts rotatably about a rotating axis perpendicular to the center axis of the relevant support shaft, and parts of the pressure joining rollers extending from free ends of the raising rollers, respectively. thus, as a toroid-shaped semi-produced tire is being rotated, side members are raised by the raising rollers and the raised side members are pressure-joined to sidewall portions of the semi-produced tire by the pressure-joining rollers.

In raising and pressure-joining side members of a semi-produced tire, the pressure-joining rollers are moved to side members of the semi-produced tire rotating about its rotating axis and brought into contact with the side members. At this time, as parts of the pressure-joining rollers extend from the free ends of the raising rollers, portions of the side members radially outwardly of those of the side members in contact with the pressure-joining rollers come into contact with outer circumferences of the raising rollers. In this case, since the raising rollers are frustoconical, tapered toward their free ends, raising forces in oblique outward directions are given to the side members by the raising rollers. Moreover, as the raising rollers are rotatable about center axes of the support shafts, the outer circumferences of the raising rollers and the side members are in rolling contact with each other, with the result that the side members are not subjected to any undue forces from the raising rollers in raising the side members.

Consequently, the side members are reliably raised by the raising rollers with high efficiency without causing any wrinkles, flaws and the like. The thus raised side members are then urged and pressure-joined to sidewall portions of the semiproduced tire by the rotating pressure-joining rollers.

In raising and pressure-joining the side members, if center axes of the support shafts are inclined at constant angles with respect to the rotating axis of the semi-produced tire, the side members can be raised stably all over the side members without causing any wrinkles flaws and the like.

The invention will be more fully understood by referring to the following detailed specification and claims taken in connection with the appended drawings.

EXPLANATION OF THE PREFERRED EMBODIMENTS

Figure 1:
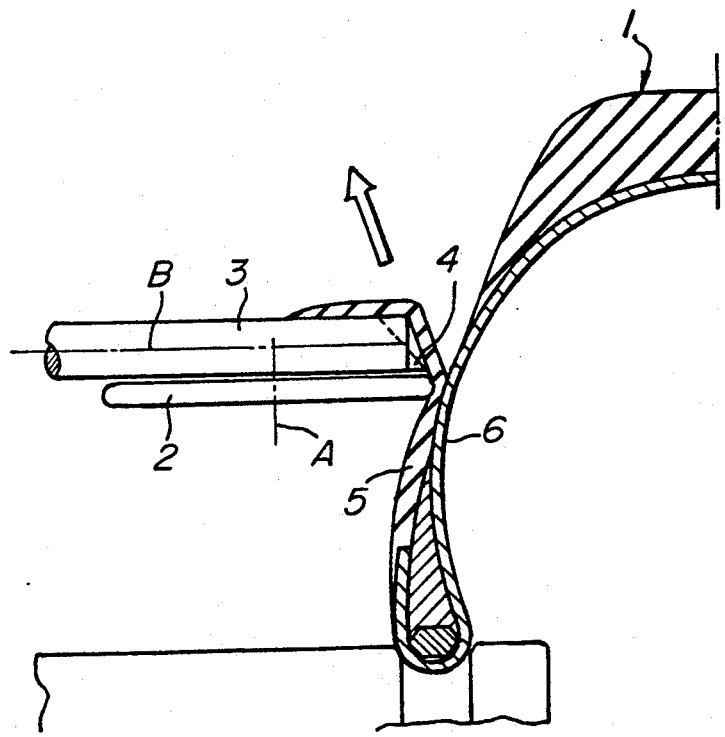
FIG. 1 is a partial sectional view of a raising and pressure-joining apparatus of the prior art.
Figure 2:
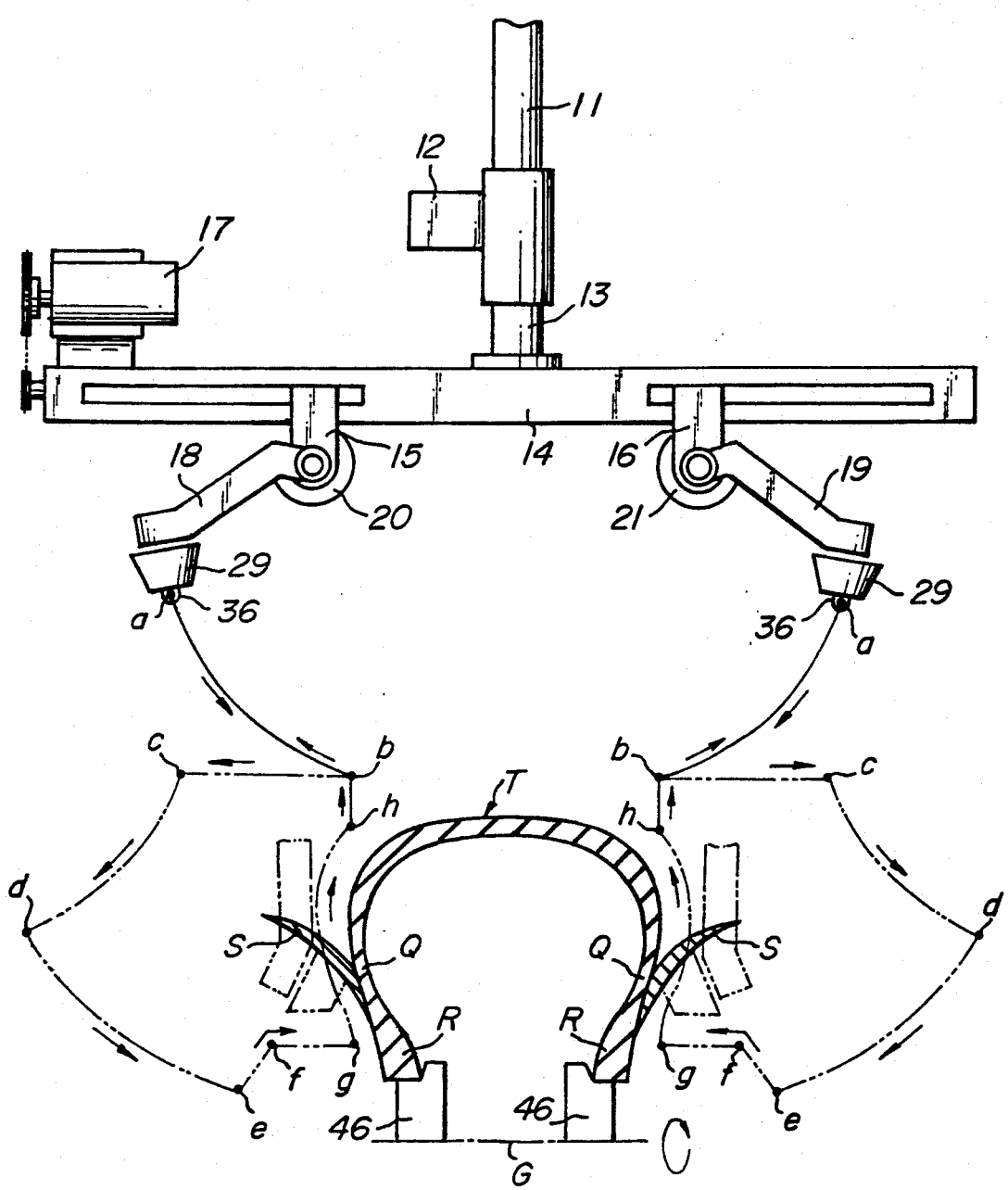
FIG. 2 is a schematic plan view wholly illustrating one embodiment of the apparatus according to the invention.
Figure 3:
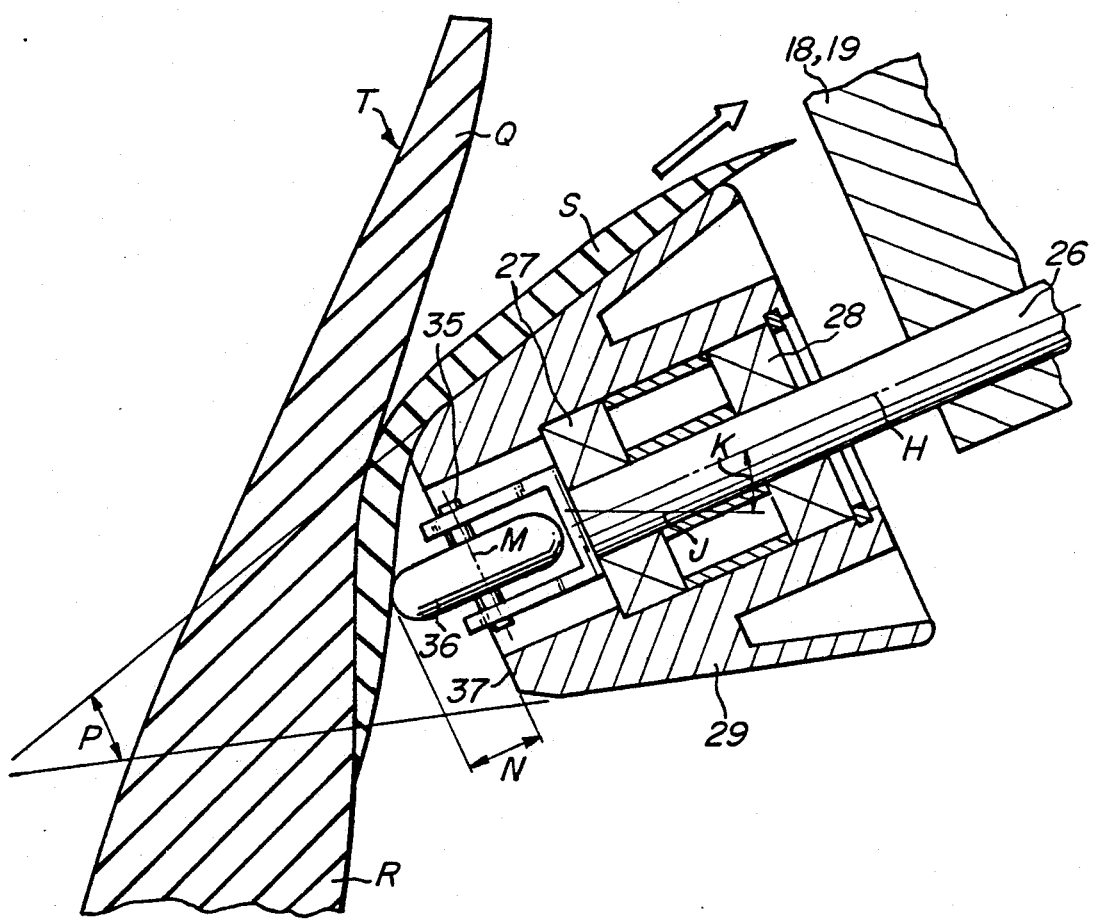
FIG. 3 is a sectional plan view illustrating the proximity of the support shaft, raising roller and pressure-joining roller in raising and pressure-joining a side member.

Referring to FIGS. 2 and 3, an apparatus according to the invention includes a frame 11 supporting a movable frame 13 reciprocatively moving by a motor 12 in radial directions of a semi-produced tire T, for example, toroidally expanded green case. Radially inner ends of side treads S as side members are attached under pressure on axially outer surfaces of bead portions R of the tire T.

On a forward end of the movable frame 13 is mounted guide plate 14 extending in parallel with a rotating axis G of the tire T for supporting a pair of blocks 15 and 16 movable along the guide plate 14. The movable blocks 15 and 16 are moved toward and away from each other in opposite directions by a motor 17. Each of the movable blocks 15 and 16 rockably supports a bottom end of a rocking arm 18 or 19 which is rockable in a plane including the rotating axis G of the tire T by means of a rotary actuator 20 or 21 mounted on the movable block 15 or 16.

A support shaft 26 is fixed to the other end of each of the rocking arms 18 and 19. A pair of bearings 27 and 28 are interposed between the support shaft 26 and a raising roller 29 which is light-weight and made of a plastic material (for example, MC nylon) for smooth rotation of the raising roller 29 (FIG. 3). As a result, each of the raising rollers 29 is supported by the support shaft 26 freely rotatably about a center axis H of the support shaft 26. As the rotation of the raising rollers 29 is very smooth, the side treads S are not subjected to undue forces and hence wrinkles and flaws are not caused in the side treads S when the side treads S are raised.

Each of the raising rollers 29 outwardly surrounds a forward end of the support shaft 26 and is frustoconical which is tapered toward a free end of the raising roller 29. A taper angle P of the raising roller 29 is preferably 39° to 49°. If the taper angle P is less than 39°, there is a tendency for the side treads S to cause wrinkles or flaws therein when the side treads S are raised. On the other hand, if the taper angle P is more than 49°, elongations of the side treads S in oblique outward directions become excessively large.

When the side treads S are being raised by the raising rollers 29, the center axes H of the support shafts 26 (coaxial with rotating axes of the raising rollers 29) are always inclined at constant intersection angles K with respect to the rotating axis G of the tire T (a straight line J in parallel with the axis G in FIG. 3). By always keeping the intersection angles K constant in raising the side treads S in this manner, they can be stably raised over all areas without causing wrinkles, flaws and the like.

In this case, the intersection angles K are preferably 20° to 30°. If the intersection angles K are less than 20°, forces in oblique outward directions acting upon the side treads S by the raising rollers 29 become low tending to cause wrinkles in the side treads S. On the other hand if, the intersection angles K are more than 30°, the above forces become large to give rise to large elongations in the side treads S. In this embodiment, the intersection angles K are 25°.

A pin 35 is fixed to the free end of each of the support shafts 26. A pressure-joining roller 36 in the form of a disc made of a steel is supported through a bearing (not shown) on the pin 35 rotatably about a rotating axis M perpendicular to the center axis H of the support shaft 26. Part (edge) of the pressure-joining roller 36 extends beyond a forward end surface 37 of the raising roller 29 by an extending distance N which is preferably 8 mm to 12 mm.

If the extending distance N is less than 8 mm, there is a risk of flaws occurring in the side treads S due to the raising rollers 29 when the side treads S are raised and pressure-joined. On the other hand, if the extending distance N is more than 12 mm, wrinkles tend to occur in the side treads S. Moreover, the outer edge of the pressure-joining roller 36 is formed to be semicircular in section in order to prevent the roller 36 from scratching the side tread S when it is being raised. A surface of the pressure-joining roller 36 may be treated by hard chrome plating, if required.

These pressure-joining rollers 36 are pressed against the side treads S by rotating force of the rotary actuators 20 and 21 to pressure-join the side treads S to sidewall portions Q of the tire T. Pressing force of the pressure-joining rollers 36 against the side treads S is preferably 3.3 kgf to 6.0 kgf. If the pressing force is less than 3.3 kgf, there is a risk of air entering between the tire T and the side treads S. On the other hand, if the pressing force is more than 6.0 kgf, elongations of the side treads S become too large when they are raised and pressure-joined. In order to accomplish good pressure-joining of the side treads, moreover, air pressure to be supplied into the rotary actuators 20 and 21 may be kept at a relatively low constant value depending up sizes of the side treads S or high pressure may be supplied into the actuators part of the way and thereafter the pressure may be replaced with low pressure.

The operation of the apparatus of this embodiment will be explained hereinafter.

It is now assumed that a semi-produced tire T mounted on rims 46 of a tire building machine has been inflated in a toroidal shape. At this time, radially inner ends of side treads S are attached to outer side surfaces of bead portions R of the tire T, while the pressure-joining rollers 36 await at poised positions a shown in FIG. 2.

When the rotary actuators 20 and 21 are actuated to rock the rocking arms 18 and 19 toward ea other, the pressure-joining rollers 36 are moved from the poised positions a to positions b. The motor 17 is then energized to move the movable blocks 15 and 16 away from each other so that the pressure-joining rollers 36 are moved from positions b to positions c.

Thereafter, the motor 12 is energized to move the movable frame 13 toward the tire T, whereas the rocking arms 18 and 19 are rocked away from each other, with the result that the pressure-joining rollers 36 are moved from the positions c to positions d. The rocking arms 18 and 19 are then rocked toward each other so that the pressure-joining rollers 36 are moved from the positions d to positions e. Thereafter, the movable frame 13 is moved away from the tire T and the movable blocks 15 and 16 are moved toward each other so that the pressure joining rollers 36 are moved from the positions e to positions f. During the above movements of pressure-joining rollers 36 in the above passages, the raising rollers 29 together with the pressure-joining rollers 36 move bypassing the side treads S onto axially outer sides of bead portions R of the tire T.

When the movable blocks 15 and 16 are then moved toward each other, the pressure-joining rollers 36 are moved from positions f to positions g so as to be in contact with axially outer surfaces of the bead portions R of the tire T. As the movable blocks 15 and 16 are still moved toward each other even after the contact of the pressure-joining rollers 36 with the bead portions R, the rocking arms 18 and 19 are rocked away from each other against the rotating forces of the rotary actuators 20 and 21. Consequently, the pressure-joining rollers 36 are in contact with outer surfaces of the tire T with predetermined contact pressures. The rocking movements of the rocking arms 18 and 19 and hence the movements of the movable blocks 15 and 16 are stopped when the intersection angles K between the axi G (the straight line J) of the tire and the center axes H of the support shafts 26 reach the above described value.

Thereafter, the tire T and the rims 46 of the tire building machine are rotated in unison at a low speed, while the movable frame 13 is moved away from the tire T. As a result, the pressure-joining rollers 36 are rotated by rotating force received from outer surfaces of the tire T and spirally moved on the outer surfaces of the tire T in radially outward directions, urging the tire T in radially inward directions thereof. By such movements of the pressure-joining rollers 36, outer surfaces of the radially inner ends of the side treads S come into contact with outer circumferences of the raising rollers 29. As the edges of the pressure-joining rollers 36 extend beyond the forward end surfaces 37 of the arising rollers 29 as above described, parts of the side treads S radially outward of those of the side treads S in contact with the pressing rollers 36 are brought into contact with the raising rollers 29 over wide areas of the side treads S.

In this case, as the raising rollers 29 are frustoconical which is tapered toward the free end, the raising rollers 29 provide raising forces in oblique outward directions shown by the arrow in FIG. 3 to the side treads S. Moreover, as the raising rollers 29 are rotatable about the center axes H of the support shafts 26, the outer circumferences of the raising rollers 29 and the side treads S become in rolling contact with each other, with the result that the side treads S are not subjected to any undue forces from the raising rollers 29 in raising the side treads S.

Consequently, the side treads S are reliably raised by the raising rollers 29 with high efficiency without causing any wrinkles, flaws and the like. The thus raised side treads S are then urged and pressure-joined to the sidewall portions Q of the tire T by means of the pressure-joining rollers 36. In this case, outer surfaces of the sidewall portions Q are curved. Therefore, when the side treads S are raised and pressure-joined by the rollers 29 and 36, the movable blocks 15 and 16 are moved toward and away from each other depending upon degrees of the curves of the sidewall portions Q to control the support shafts 26 so as to always maintain constant the intersection angles K of the center axes H of the support shafts 26 with respect to the rotating axis G of the tire T.

The raising rollers 29 and the pressure-joining rollers 36 move radially outwardly along the outer surfaces of the tire T, while the side treads S are raised and pressure-joined by the rollers 29 and 36 in this manner. When the raising and pressure-joining operation all over the side treads S has been completed, the pressing rollers 36 arrive at positions h shown in FIG. 2. Thereafter, the movable frame 13 is moved away from the tire T and the pressure-joining rollers 36 are moved to the positions b.

The rocking arms 18 and 19 are then rocked away from each other so that the pressure-joining rollers 36 are returned to the initial poised positions a. A belt and a tread band are then incorporated in the tire thus joined with the side treads S to form a green tire. The green tire is then removed from the tire building machine and transferred to a next station for a next process. The above is one cycle of the operation of the apparatus of the embodiment of the invention. Thereafter, such an operation is repeated for continuously producing tires.

As can be seen from the above explanation, side members can be raised and pressure-joined with high efficiency without causing any wrinkles and flaws according to the invention.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire side member raising and pressure-joining apparatus comprising: two support shaft, two raising rollers each supported by a forward end of each of the support shafts rotatably about a center axis of the relevant support shaft as a rotating axis and being frustoconical tapered toward its free end, and tow pressure-joining rollers each supported at a distal end of said forward end of each of the support shafts rotatably about a rotating axis perpendicular to the center axis of the relevant support shaft, and portions of the pressure-joining rollers extending form free ends o the raising rollers, respectively, said apparatus being configured such that as a toroid-shaped semi-produced tire located adjacent said apparatus is being rotated, each respective raising roller and pressure joining roller is capable of movement radially outward along the outer side surfaces of the semi-produced tire whereby side members are raised by he raisin rollers and are substantially simultaneously pressure-joining to sidewall portion of the semi-produced tire by movement and rotation of said pressure-joining rollers contacting said side members.

2. A tire side member raising and pressure-joining apparatus as set forth n claim 1, wherein said support shafts are fixed to ends of rocking arms, respectively, said rocking arms being rockable about their other ends and movable toward and away from each other and toward and away from the semi-produced tire.

3. A tire side member raising and pressure-joining apparatus as set forth in claim 2, wherein said rocking arms are rockably supported with other ends by movable blocks and rockably moved by rotary actuators mounted on the movable blocks, said movable blocks being slidably movable along a guide plate toward and away from each other, and said guide plate extending in parallel with a rotating axis of the semi-produced tire and movable toward and away from the tire.

4. A tire side member raising and pressure-joining apparatus as set forth in claim 1, wherein said pressure-joining rollers are in the form of a disc whose outer edge is semi-circular in section in a plane including its rotating axis.

5. A tire side member raising and pressure-joining apparatus as set forth in claim 1, wherein distances of the pressure-joining rollers extending from the raising rollers are 8 mm to 12 mm.

6. A tire side member raising and pressure-joining apparatus as set forth in claim 1, wherein center axes of the support shafts are inclined at constant angles with respect to rotating axis of the semi-produced tire in raising and pressure-joining the side members.

7. A tire side member raising and pressure-joining apparatus as set forth in claim 6, wherein said angles are 20° to 30°.

8. A tire side member raising and pressure-joining apparatus as set forth in claim 1, wherein said pressure-joining rollers are urged against the side members by forces of 3.3 kgf to 6.0 kgf in pressure-joining them.

* * * * *